(12) United States Patent
Eilam et al.

(10) Patent No.: US 7,599,475 B2
(45) Date of Patent: Oct. 6, 2009

(54) METHOD AND APPARATUS FOR GENERIC ANALYTICS

(75) Inventors: Barak Eilam, Raanana (IL); Yuval Lubowich, Raanana (IL)

(73) Assignee: Nice Systems, Ltd., Raanana (IL)

( * ) Notice: Subject to any disclaimer, the term of this patent is extended or adjusted under 35 U.S.C. 154(b) by 202 days.

(21) Appl. No.: 11/743,156

(22) Filed: May 2, 2007

(65) Prior Publication Data

US 2008/0228296 A1 Sep. 18, 2008

Related U.S. Application Data

(60) Provisional application No. 60/894,230, filed on Mar. 12, 2007.

(51) Int. Cl.
*H04M 1/64* (2006.01)
(52) U.S. Cl. ............... 379/88.09; 379/88.01; 379/88.1; 379/112.01; 379/114.14; 379/168; 381/107; 704/235; 704/270; 704/500; 709/205
(58) Field of Classification Search ........... 379/88.1, 379/88.09, 88.01, 112.01, 114.14, 168; 705/1; 715/203; 381/107; 704/235, 270, 500; 709/205
See application file for complete search history.

(56) References Cited

U.S. PATENT DOCUMENTS

| | | | |
|---|---|---|---|
| 4,145,715 A | 3/1979 | Clever | |
| 4,527,151 A | 7/1985 | Byrne | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,168 A | 10/1994 | Crick | |
| 5,404,170 A | 4/1995 | Keating | |
| 5,491,511 A | 2/1996 | Odle | |
| 5,519,446 A | 5/1996 | Lee | |
| 5,642,428 A | * 6/1997 | Nowack | ............ 381/107 |
| 5,734,441 A | 3/1998 | Kondo et al. | |

(Continued)

FOREIGN PATENT DOCUMENTS

DE 10358333 7/2005

(Continued)

OTHER PUBLICATIONS

Freedman, I. Closing the Contact Center Quality Loop with Customer Experience Management, Customer Interaction Solutions, vol. 19, No. 9, Mar. 2001.

(Continued)

*Primary Examiner*—Gerald Gauthier
(74) *Attorney, Agent, or Firm*—Ohlandt, Greeley, Ruggiero & Perle, L.L.P

(57) ABSTRACT

A method and apparatus for revealing business or organizational aspects of an organization in audio signals captured from interactions, broadcasts or other sources. The method and apparatus activate an efficient process to detect events within the audio signal, and then activate a more resource-consuming additional process around the detected events, thus enhancing efficiency of the process. The detected events and the output of the additional process are analyzed by an analysis process to reveal business aspects, terms, or other events in the audio signal. The analysis results, and possibly the events and output of the additional processing are optionally presented to a user.

17 Claims, 4 Drawing Sheets

U.S. PATENT DOCUMENTS

| | | | |
|---|---|---|---|
| 5,742,349 | A | 4/1998 | Choi et al. |
| 5,751,346 | A | 5/1998 | Mitchell et al. |
| 5,790,096 | A | 8/1998 | Hill, Jr. |
| 5,796,439 | A | 8/1998 | Hewett et al. |
| 5,818,907 | A * | 10/1998 | Maloney et al. ......... 379/32.01 |
| 5,895,453 | A | 4/1999 | Cook et al. |
| 5,920,338 | A | 7/1999 | Katz |
| 5,946,375 | A * | 8/1999 | Pattison et al. ......... 379/112.01 |
| 6,014,647 | A | 1/2000 | Nizzari et al. |
| 6,028,626 | A | 2/2000 | Aviv |
| 6,031,573 | A | 2/2000 | MacCormack et al. |
| 6,037,991 | A | 3/2000 | Thro et al. |
| 6,070,142 | A | 5/2000 | McDonough et al. |
| 6,081,606 | A | 6/2000 | Hansen et al. |
| 6,092,197 | A | 7/2000 | Coueignoux |
| 6,094,227 | A | 7/2000 | Guimier |
| 6,111,610 | A | 8/2000 | Faroudja |
| 6,134,530 | A | 10/2000 | Bunting et al. |
| 6,138,139 | A | 10/2000 | Beck et al. |
| 6,167,395 | A | 12/2000 | Beck et al. |
| 6,170,011 | B1 | 1/2001 | Beck et al. |
| 6,212,178 | B1 | 4/2001 | Beck |
| 6,230,197 | B1 | 5/2001 | Beck et al. |
| 6,275,569 | B1 * | 8/2001 | Cannon ................. 379/88.01 |
| 6,295,367 | B1 | 9/2001 | Crabtree et al. |
| 6,327,343 | B1 | 12/2001 | Epstein et al. |
| 6,327,566 | B1 * | 12/2001 | Vanbuskirk et al. ......... 704/257 |
| 6,330,025 | B1 | 12/2001 | Arazi et al. |
| 6,332,147 | B1 * | 12/2001 | Moran et al. ............. 715/203 |
| 6,345,305 | B1 | 2/2002 | Beck et al. |
| 6,427,137 | B2 | 7/2002 | Petrushin |
| 6,510,208 | B1 * | 1/2003 | Komiya .................. 379/88.1 |
| 6,549,613 | B1 | 4/2003 | Dikmen |
| 6,570,608 | B1 | 5/2003 | Tserng |
| 6,604,108 | B1 | 8/2003 | Nitahara |
| 6,628,835 | B1 | 9/2003 | Brill et al. |
| 6,640,210 | B1 * | 10/2003 | Schaefer et al. ........... 704/235 |
| 6,704,409 | B1 | 3/2004 | Dilip et al. |
| 6,710,955 | B2 * | 3/2004 | Woodill et al. ............. 360/32 |
| 6,738,742 | B2 * | 5/2004 | Badt et al. ............... 704/270 |
| 6,804,806 | B1 * | 10/2004 | Bansal et al. ............. 715/201 |
| 7,076,427 | B2 | 7/2006 | Scarano et al. |
| 7,103,806 | B1 | 9/2006 | Horvitz |
| 7,353,169 | B1 * | 4/2008 | Goodwin et al. .......... 704/224 |
| 7,386,105 | B2 * | 6/2008 | Wasserblat et al. ..... 379/114.14 |
| 2001/0052081 | A1 | 12/2001 | McKibben et al. |
| 2002/0005898 | A1 | 1/2002 | Kawada et al. |
| 2002/0010705 | A1 | 1/2002 | Park et al. |
| 2002/0059283 | A1 | 5/2002 | Shapiro et al. |
| 2002/0087385 | A1 | 7/2002 | Vincent |
| 2003/0059016 | A1 | 3/2003 | Lieberman et al. |
| 2004/0015351 | A1 * | 1/2004 | Gandhi et al. ............. 704/240 |
| 2004/0161133 | A1 | 8/2004 | Elazar et al. |
| 2004/0249650 | A1 * | 12/2004 | Freedman et al. ............. 705/1 |
| 2005/0084082 | A1 * | 4/2005 | Horvitz et al. ......... 379/114.06 |
| 2006/0010206 | A1 * | 1/2006 | Apacible et al. ............ 709/205 |
| 2006/0093135 | A1 | 5/2006 | Fiatal et al. |
| 2006/0106619 | A1 * | 5/2006 | Iser et al. ..................... 704/500 |
| 2007/0071206 | A1 * | 3/2007 | Gainsboro et al. .......... 379/168 |
| 2007/0242040 | A1 * | 10/2007 | Ullrich et al. ............... 345/157 |
| 2007/0292106 | A1 * | 12/2007 | Finkelstein et al. ........... 386/55 |
| 2008/0255842 | A1 * | 10/2008 | Simhi ........................ 704/246 |

FOREIGN PATENT DOCUMENTS

| | | |
|---|---|---|
| EP | 1 484 892 | 8/2004 |
| WO | WO 95 29470 A | 11/1995 |
| WO | WO 98 01838 A | 1/1998 |
| WO | WO 00/73996 | 12/2000 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |
| WO | WO 2004 091250 | 10/2004 |

OTHER PUBLICATIONS

PR Newswire, Nice Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

(Hebrew) print from Haaretz, "The Computer at the Other End of the Line", Feb. 17, 2002.

Article Sertainty—Agent Performance Optimization—2005 SE Solutions, Inc.

Lawrence P. Mark SER—White Paper—Sertainty Quality Assurance—2003-2005 SER Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

* cited by examiner

METHOD AND APPARATUS FOR GENERIC ANALYTICS

RELATED APPLICATIONS

The present disclosure claims priority from provisional patent application Ser. No. 60/894,230 filed on Mar. 12, 2007.

BACKGROUND OF THE INVENTION

1. Field of the Invention

The present invention relates to audio content analysis in general, and to a method and apparatus for retrieving business insight from auditory information in particular.

2. Discussion of the Related Art

Within organizations or organizations' units that handle auditory data including interactions, such as call centers, customer relations centers, trade floors, law enforcements agencies, homeland security offices or the like, it is often required to extract information from the audio segments in an automated and efficient manner. The audio segments may be of various types, including phone calls using all types of phone systems, transmitted radio, recorded audio events, walk-in center events, video conferences, e-mails, chats, instant messaging, access through a web site, radio or TV broadcast, audio segments downloaded from the internet, audio files or streams, the audio part of video files or streams or the like. The information to be extracted from the segments may relate to various aspects, such as content of the segments, categories to which the segments may be classified, entities participating, subject, products, interaction type, up-sale opportunities, detecting high-risk calls, detecting legal threats, customer churn analysis, customer satisfaction, first call resolution, or others. Having structured information related to segments may be important for analyzing issues such as trend analysis, frequently raised subjects, hidden link analysis between segments, what are the main contributions to call volume, pattern detection, how can the volume be reduced and others. The analysis can also be used for taking business actions, such as locating missed opportunities, locating dissatisfied customers, more accurate resource allocation, such as allocating more agents to handle calls related to one or more subjects of business process optimization, cost reduction, improving quality/service/product, agent tutoring, preventing customer churn, or for other purposes, for example purposes related to security such as relating segments, relating speakers, or the like.

Raw material for audio analysis tools includes the text of the segments to be analyzed, such as interactions, broadcasts or the like as well as additional information, such as indication of emotional parts within the interaction, call flow information, CTI data, or others. The text in its entirety, subject to quality limitations, can be received through the usage of a speech-to-text engine, and sporadic words can be extracted by using word-spotting engines.

However, speech to text engines, which receive as input audio capturing and produce the full text of the captured audio, generally consume significant time and computing resources, thus enabling transcription of only a fragment of the collected interactions. If a larger part of the interactions is to be transcribed, then significant computing power is required. On the other hand, word spotting engines or phonetic search engines, which spot singular words, word parts or syllables in audio interactions, are faster but are generally efficient only for a limited word list of tens-to-thousands of words, or a set of predefined syllables or word parts. Thus, analysis tools which require full text of a large corpus of interactions can not be used with transcription engines, phonetic search, or word spotting engines.

There is therefore a need for an automated system and method that will enable the usage of analysis tools for analyzing audio segments in general, and text analysis tools in particular, while being efficient enough to enable analysis of significant amount of audio interactions.

SUMMARY OF THE PRESENT INVENTION

The disclosed method and apparatus enable the efficient processing of audio segments by activating an initial efficient processing on the segments, such as word spotting, phonetic decoding or the like. The initial processing locates events, i.e. points in the audio segments in which a word, term, syllable or the like is located. Then additional processing, possibly requiring more resources is performed on the areas of the segments which surround the located events. The additional processing provides more information. The information provided by the initial processing, i.e. the events, and the information provided by the additional processing are analyzed for connections or other conclusions. The events, the additional information or the connections thereof are preferably presented in a representation, such as a graphic representation.

In accordance with the disclosure, there is thus provided a method for revealing an aspect related to an organization from an audio signal, the method comprising the steps of: performing an initial processing on the audio signal for locating an event within the audio signal, the event associated with an at least one time indication within the audio signal; performing additional processing on a part of the audio signal, the part extending at least a first predetermined length of time preceding the at least one time indication associated with the event and at least a second predetermined length of time following the at least one time indication associated with the event, the additional processing providing output related to the audio signal; and analyzing the at least one event and the output of the additional processing to reveal the at least one aspect related to the organization. The method can further comprise a preprocessing step for enhancing the audio signal. The method optionally comprises a presentation step for presenting the aspect related to the organization. Within the method, the presentation is optionally a graphic presentation. The event is optionally marked on the presentation wherein the marking is indicative to a characteristic of the event. Within the method a connection between the event and the aspect is marked. The marking is optionally in a manner indicative to a characteristic of the connection. The initial processing can comprise activating one or more of the group consisting of: a word spotting process, a phonetic decoding process, an emotion detection process, and a call flow analysis process. The additional processing optionally comprises activating a speech-to-text process. Within the method, analyzing the event and the output of the additional processing optionally comprises one or more of the group consisting of: link analysis, root cause analysis, finding relations, finding connections, finding an at least one hidden pattern, and clustering of two or more audio segments based on the initial processing. The audio signal is optionally captured from a source selected from the group consisting of: a telephone, a voice over IP source, a walk-in recording, a TV broadcast, a radio broadcast, an audio signal downloaded from the internet, an audio file, an audio stream, audio data of a video file and audio data of a video stream.

Another aspect of the disclosed invention relates to an apparatus for revealing an aspect related to an organization from an audio signal, the apparatus comprising: an initial processing component for activating an initial processing engine for locating an event within the audio signal, the event associated with an at least one time indication within the audio signal; an additional processing component for activating an additional processing engine for performing additional processing on a part of the audio signal, the part extending at least a first predetermined length of time preceding the at least one time indication associated with the event and at least a second predetermined length of time following the at least one time indication associated with the event, the additional processing providing output related to the audio signal; and an analysis component for analyzing the event and the output of the additional processing to reveal the aspect related to the organization. The apparatus can further comprise a logging or capturing component for logging or capturing the audio signal. The apparatus optionally comprises a presentation component for presenting the aspect related to the organization. The apparatus can further comprise a storage component for storing the aspect or the event or the output or the aspect. The apparatus can further comprise a capturing or logging component. The capturing or logging component optionally captures or logs audio signals from a source selected from the group consisting of: a telephone, a voice over IP source, a walk-in recording, a TV broadcast, a radio broadcast, an audio signal downloaded from the internet, an audio file, an audio stream, audio data of a video file and audio data of a video stream. The apparatus can further comprise a playback component for playing the audio signal or a report generation component for generating a report relating to the event or to the output of the additional processing. The apparatus optionally comprises a quality monitoring component for monitoring a quality parameter associated with a participant in an interaction represented by the audio signal.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
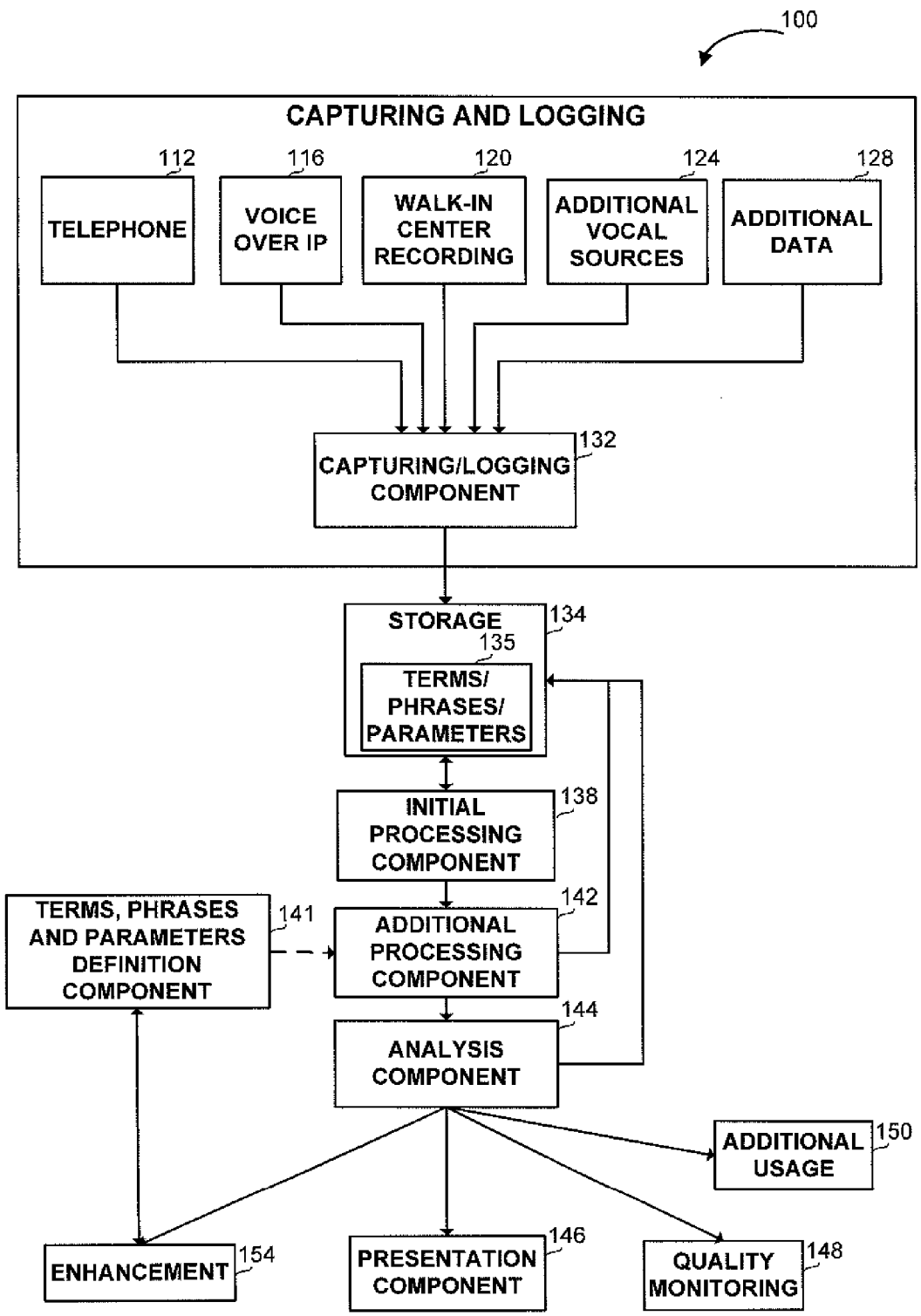
FIG. 1 is a block diagram of the main components in a typical environment in which the disclosed method and apparatus is used.

The present invention provides a method and apparatus for retrieving business or other insights from audio segments.

The disclosed method and apparatus use audio signals describing audio segments, such as interactions or broadcasts, together with audio analysis technologies in order to gain business insight relevant to various business aspects, such as customer satisfaction or dissatisfaction, up-sale opportunities, detecting high-risk calls, detecting legal threats, customer churn analysis, first call resolution, relating segments, connection between targets in law enforcement or security organizations, or the like. The disclosed method and apparatus involve performing an initial audio analysis processing on the audio signals, by activating processes or engines such as word spotting, phonetic decoding using phonetic search engine, emotion detection, a call transfer or the like, for locating events or areas of interest, such as occurrences of terms from a predetermined term list, emotional parts of the interaction, or the like. The initial processing preferably comprises activating efficient processes or engines, i.e. their time or other resource consumption enables the processing of multiple time units, such as minutes in every time unit of processing, For example, an engine that requires 1 minute of processing for every 100 minutes of audio using a certain computing platform, is more efficient that an engine that requires 10 minutes of processing for the same 100 minutes of audio using the same computing resources. Once the events and their location within the interaction are determined, full transcription or another resource-consuming process is preferably performed on parts of the audio signal, in the areas preceding and following the event. The text or another product resulting from activating the process on the parts of the audio signal is analyzed and additional terms or events are identified according to their frequency and relation to the initial events, such as the spotted terms, thus providing business insight and further understanding of the issues, problems or topics discussed in the area of the events. Processes such as emotion detection, word spotting, whether performed by phonetic search, phonetic decoding or in any other way, are generally faster than full transcription or other time-consuming processing. Thus, when transcribing or otherwise processing only these areas of the interaction which are known to contain events interesting to the organization, time and computing resources are saved, thus enabling to process more segments than if the full interaction was to be processed by a heavy-resource-consuming process. In the context of the disclosed method and apparatus, the word "term" relates to a syllable, a phrase or to a combination of one or more words, such as a Boolean expression involving one or more syllables, words or phrases, which are regarded as a unit.

The method and apparatus are typically used in an organization such as a call center, a trading floor, a service center of an organization, or any other organization or organizational unit which receives a mass of segments which include an auditory part. Interaction segments are usually between a member of the organization and a second party, wherein the second party can be a customer, a supplier, a business associate, another member or the organization, or any other person communicating with the organization. The interactions can be received via telephone of any kind including a landline, a cellular phone, a voice over IP phone or the like, a microphone, for example when interactions occurring in a walk-in center are captured, an audio part of video recording of an interaction such as a video conference or the like. The interactions are optionally recorded for future retrieval. The interactions can be processed either in real-time as they are captured, in near-real-time, i.e. shortly after they are captured, or off-line after being stored retrieved. Other audio segments can comprise TV or radio broadcasts, audio segments downloaded from the Internet, audio files or streams, audio part of video files or streams, or others. The captured interaction or other sources are in the form of audio signals which can undergo processing.

Referring now to FIG. 1, showing a block diagram of the main components in a typical environment in which the disclosed invention is used. The environment, generally referenced 100, is an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, non-auditory segments and additional data. The capturing of voice interactions, or the vocal part of other interactions, such as video, can employ many forms and technologies, including trunk side, extension side, summed audio, separate audio, various encoding and decoding protocols such as G729, G726, G723.1, and the like. The vocal interactions usually include telephone 112, which is currently the main channel for communicating with users in many organizations. The voice typically passes through a PABX (not shown), which in addition to the voice of two or more sides participating in the interaction collects is additional information discussed below. A typical environment can further comprise voice over IP channels 116, which possibly pass through a voice over IP server (not shown). The interactions can further include face-to-face interactions, such as those recorded in a walk-in-center 120, and additional sources of vocal data 124, such as microphone, intercom, the audio part of video capturing, vocal input by external systems, broadcasts, files, or any other source. In addition, the environment comprises additional non-vocal data of various types 128. For example, Computer Telephony Integration (CTI) equipment used in capturing the telephone calls can track and provide data such as number and length of hold periods, transfer events, number called, number called from, DNIS, VDN, ANI, or the like. Additional data can arrive from external or third party sources such as billing, CRM, screen events including text entered by a call representative during or following the interaction, documents and the like. The data can include links to additional segments in which one of the speakers in the current interaction participated. Data from all the above-mentioned sources and others is captured and preferably logged by capturing/logging component 132. Capturing/logging component 132 comprises a computing platform running one or more computer applications as is detailed below. The captured data is optionally stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage 134 is storage 135 which stores the definition of the words or phrases to be spotted, or any other parameters related to executing any of the processing engines on captured data. Storage 134 can comprise a single storage device or a combination of multiple devices. Words, terms, phrases and parmeters definition component 141 is used by a person in charge of defining the terms to be spotted or other processing-related parameters, for defining the terms or parameters. The system further comprises initial processing component 138, for activating the initial processing processes or engines, which are preferably faster or more efficient than other engines. The engines activated by initial processing component 138 may comprise for example a word spotting engine, phonetic search engine, emotion detection engine, a call flow analysis engine, a talk analysis engine, and other tools for efficient retrieval or extraction of data from voice. Extraction engines may further comprise engines for retrieving data from video, such as face recognition, motion analysis or others. The engines activated by initial processing component 138 preferably provide results with time indication, the time indication preferably relates to the timing of the events within the interaction, for example, if the word "Account" was spotted 30 seconds from the beginning of the interaction, the word and the time stamp will be optionally stored in storage 134, and transferred to secondary processing component 142. Secondary processing component 142 receives the information and events extracted from the segments by initial processing component 138, and possibly statistical data of previous segments or additional materials. Additional processing component 142 activates additional engines to those activated by initial processing component 138. The additional engines are preferably activated only on those parts of the segments which surround the events found by one or more of the engines activated by initial processing component 138. For example, the additional engines can be activated a predetermined number of seconds prior to the beginning of each event and a predetermined number of seconds after each event. The number of seconds prior to the event can be the same as or different from the number of seconds following the events. Further, different time intervals prior to and following the events, during which the additional engines are activated, can be defined for different events. The additional engines are preferably more time or resource consuming than the initial engines, and are therefore activated on limited parts of the interaction. In yet another preferred implementation, the additional engines can be operated on all the segments, and their results crossed or verified with the results of the initial engines. The results of initial processing component 138 and additional processing component 142 are transferred to analysis component 144. Analysis component 144 can analyze the results and find connections or relations between segments or participants therein, find possibly hidden patterns, perform clustering of similar audio interactions based on the speech to text results, or perform link analysis, root cause analysis or the like. The results of analysis engine 144 are preferably stored in storage 135. The results of analysis engine 144 are preferably also sent to presentation component 146 for presentation in any way the user prefers, including for example various graphic representations, textual presentation, table presentation, or the like. The results can further be transferred to and analyzed by a quality monitoring component 148, for monitoring one or more quality parameters of a participant in an interaction represented by the audio segment, such as an agent handling a conversation in a call center. The results are optionally transferred also to additional components 150, if required. Such components may include playback components, report generation components, alert generation components, or others. A playback component in association with the apparatus can be designed to enable a user to focus on the interesting part of the audio segments, as well as to listen to the whole segment. The analysis performed by analysis component 144 preferably reveals significant business aspects, insights, terms or events in the segments, which can be fed back into words, phrases, terms and parameters definition component 141 and be considered in future terms and parameters definition sessions performed using terms and parameters definition component 141.

All components of the system, including capturing/logging components 132, the engines activated by initial processing component 138 and additional processing component 142, analysis engine and presentation component are preferably collections of instruction codes designed to run on one or more computing platforms, such as a personal computer, a mainframe computer, or any other type of computing platform that is provisioned with a memory device (not shown), a CPU or microprocessor device, and several I/O ports (not shown). Alternatively, each component can be a DSP chip, an ASIC device storing the commands and data necessary to execute the methods of the present invention, or the like. Each component can further include a storage device (not shown), storing the relevant applications and data required for processing. Each software component or application executed by each computing platform, such as the capturing applications or the categorization component is preferably a set of logically inter-related computer instructions, programs, modules, or other units and associated data structures that interact to perform one or more specific tasks. All applications and software components can be co-located and run on the same one or more computing platforms, or on different platforms. In yet another alternative, the information sources and capturing platforms can be located on each site of a multi-site organization, and one or more of the processing or analysis components can be remotely located, and analyze segments captured at one or more sites and store the results in a local, central, distributed or any other storage.

Figure 2:
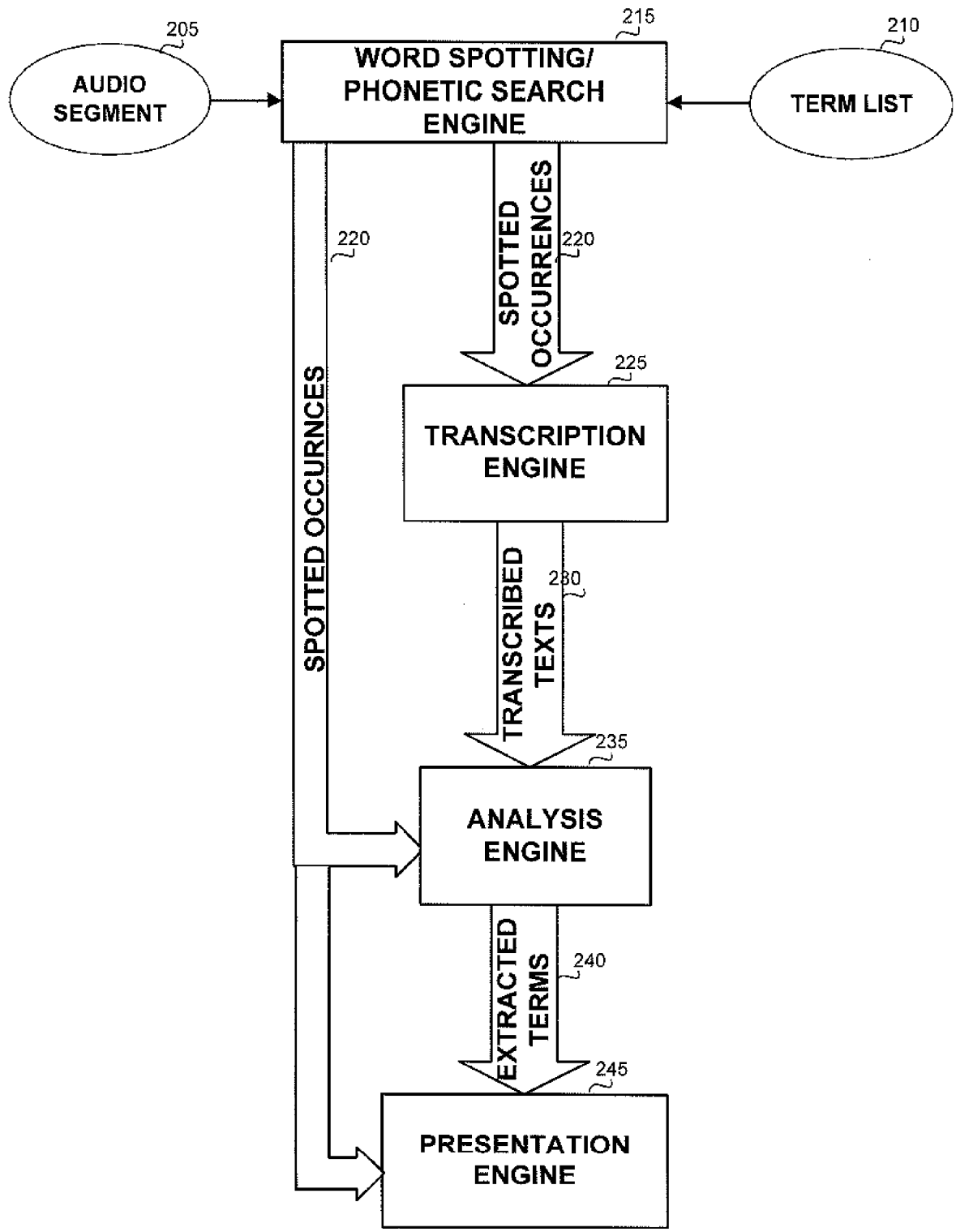
FIG. 2 is a block diagram of a preferred embodiment of the disclosed apparatus.

Referring now to FIG. 2, showing a block diagram of the main components in an exemplary apparatus according to the disclosed invention. In the apparatus of FIG. 2, the initial engine is a word spotting engine or a phonetic decoding engine, while the additional engine is a speech-to-text engine. The components are preferably collections of computer instructions, arranged in modules, static libraries, dynamic link libraries or other components. The components are executed by one or more computing platforms, such as a general purpose computer including a personal computer, or a mainframe computer. Alternatively, the components can be implemented as firmware ported for a specific processor such as digital signal processor (DSP) or microcontrollers, or hardware or configurable hardware such as field programmable gate array (FPGA) or application specific integrated circuit (ASIC).

The input to the apparatus comprises audio segments 205 to be is examined, including captured or recorded interactions, radio, television or other broadcasts, audio files or other auditory inputs. When the initial processing is word spotting, the input further comprises initial term list 210, comprising terms, words or phrases the user expects to find in the situations he wishes to explore. For example, in situations such as dissatisfied customers, the terms "unhappy", "embarrassed", "can not believe", or the like may appear. Engine 215 is any word, phrase, or term-spotting engine, such as NSC SpotLight, manufactured by NSC (www.nscspeech.com), or any other word-spotting engine, any phonetic search engine, or the like. The output of engine 215 comprises spotted occurrences 220. If the initial processing is word spotting, spotted occurrences 220 comprise the terms of term list 210 which were spotted in audio interaction, together with their location and possibly quality indicators such as accuracy, certainty, or word quality. If the initial processing is phonetic search, spotted occurrences comprise the relevant parameters, preferably including the term and the location. The term location in this context relates to the point in time within the audio interaction in which a term was spotted, preferably in milliseconds from the beginning of the audio interaction. Alternatively, the location can be expressed in two numbers, indicating the beginning and the end of the event within the signal. Spotted occurrences 220 are fed into a transcription engine 225, such as Dragon Naturally Speaking manufactured by Nuance (www.nuance.com). Transcription engine 225 receives the locations of the spotted events, and an indication to one or more parts of the audio signal. The parts preferably extend a period of time preceding and a period of time following the location in which the spotted event was located. If the location is indicated in two numbers, the part can extend from a period of time preceding the beginning of the event to another period of time following the end of the event. Transcription engine 225 then performs full transcription of the parts of the audio interaction as specified by the time periods. For example, if a term was spotted 90 seconds from the beginning of the interaction, and the time periods are 20 seconds preceding the term and 30 seconds following the term, then the part of the audio interaction being transcribed starts at 70 seconds from the beginning of the interaction and ends at 120 seconds from the beginning of the interaction. If areas of the interaction in which events were spotted overlap, the areas may be transcribed together. The output of transcription engine 225 is transcribed texts 230. Transcribed texts 230, together with the initially spotted occurrences 220 are transferred to analysis engine 235 for analysis, such as link analysis, root cause analysis, essence extraction or other analysis, in order to retrieve relations between the originally spotted terms or events and additional terms appearing in the audio signal in the proximity of the spotted terms. The additional terms, revealed by transcribing parts of the audio signal, may suggest business insights, which are helpful in understanding customer needs, customer dissatisfaction causes and additional information. For example, a credit card company may reveal that the term "embarrassed" appears often in proximity to the phrase "the card is declined". The initial and additional terms are optionally transferred to presentation engine 245 which provide graphic or other presentations for the initial terms, additional terms and the relation between them.

Figure 3:
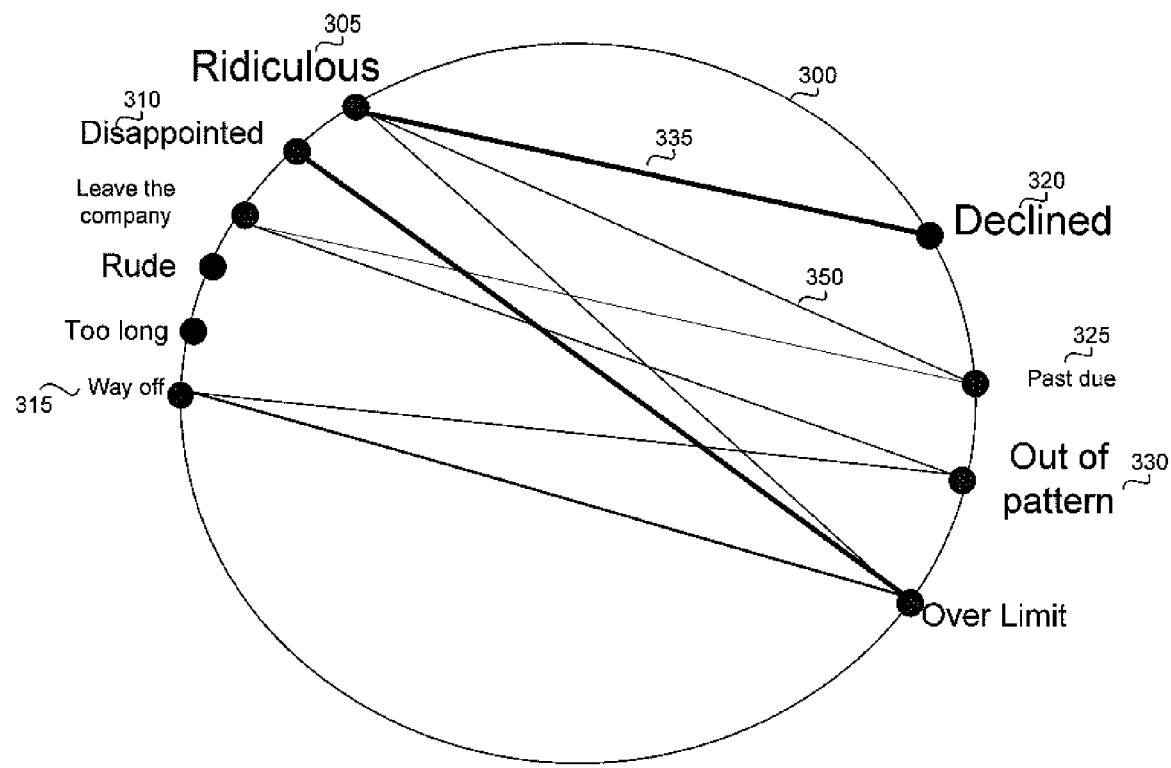
FIG. 3 is a schematic illustration of a presentation of the results of a preferred embodiment of the disclosed method and apparatus.

Referring now to FIG. 3, showing an exemplary graphic presentation of the results provided by a preferred embodiment of the disclosed apparatus and method. The employed engines in the example of FIG. 3 are, similarly to the apparatus of FIG. 2, word spotting as an initial engine and speech-to-text as additional engine. The presentation shows the results around a circle or another geometric shape 300. The terms from the initial term list that were spotted in the processed audio segments are marked in dots along the left hand side of circle 300, such as "Ridiculous" 305, "Disappointed" 310, "Way off" 315 and others. On the right hand side of the circle are terms found in the transcribed parts of the audio segments surrounding the spotted terms, such as "Declined" 320, "Past due" 325 and others. The terms on the right hand side were determined by their frequencies in the transcribed parts and are preferably not predetermined. The lines connecting a term from the left hand side with a term from the right hand side designates connection, i.e. frequent occurrences of the additional term appearing on the right hand side in proximity with a term from the initial list appearing on the left hand side. The relative frequency of terms, either from the initial term list or from the additional term is optionally reflected by the font size or by another factor, such as shade of color in which the term appears. For example, the word "Ridiculous" 305 was spotted more often than the term "Way off" 315, therefore the word "Ridiculous" 305 appears in larger font than the term "Way off" 315. Also, the thickness of a line connecting an initial term and an additional term is indicative to the frequency of the additional word in proximity of occurrences of the initial term. Thus, the word "Declined" 320 appears more often in the proximity of the word "Ridiculous" 305 than the term "Past due" 325 appears in the proximity of the word "Ridiculous" 305, therefore line 335 is thicker than line 350. It will be appreciated that the terms or other events, and the connections can be marked in any manner indicative of any characteristic of the event or connection, such as the importance, and not necessarily their frequency. It will further be appreciated by a person skilled in the art that the presentation described in FIG. 3 is exemplary only, and that other representations, including tabloid, textual, or graphic representation of any kind can be used for providing the results of the disclosed method and apparatus. It will also be appreciated that the presentation is not limited to words and terms, but other or additional events such as "motion", "negative emotion", "extensive cross talk", "hold beyond X seconds", or others can be marked and connected similarly to terms.

Figure 4:
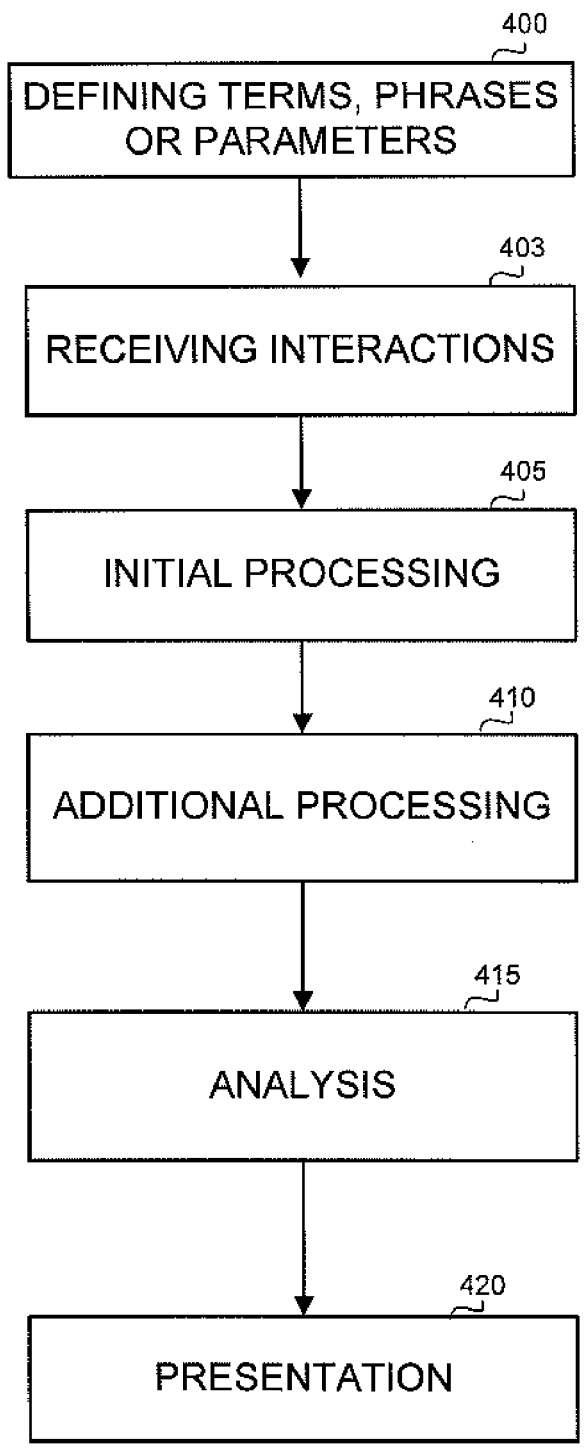
FIG. 4 shows the main steps in a flowchart of a preferred embodiment of the disclosed method.

Referring now to FIG. 4, showing a flowchart of the main steps in a preferred embodiment of the disclosed method. The method starts on step 400 on which a user, such as an administrator, a person in charge of quality assurance, a supervisor, a person in charge of customer relationship or any other person defines parameters, such as terms, thresholds or other parameters related to the initial processing or additional processing, The parameters can include words to be spotted, certainty or accuracy parameters, word quality indications, time constants or time constraints such as the length of period to be processed before and after events, or the like. Then on step 403 the captured or logged segments are received for processing. Optionally, the segments undergo some preprocessing, such as speaker separation, noise reduction, or the like. The segments can be captured and optionally stored and retrieved. On step 405 initial processing, which comprises activating an engine or process for locating events such as terms, spotted words, emotional parts of an interaction, or events associated with the call flow, such as number of transfers, number and length of holds, silence period, talk-over periods or others, is performed on the segments. The processing optionally uses parameters such as a predetermined term list for word spotting, parameters for phonetic decoding, thresholds, time constants or the like. Word spotting can be performed in the form of a phonetic search or in any another method. Phonetic search can be performed for detecting words, terms, syllables, or other parts of speech. The output of step 405 is a collection of events, each event preferably associated with a time indication related to a time within the interaction. On step 410 the parts of the segments surrounding the events undergo additional processing, such as speech-to-text, i.e. full transcription. The parts of the interaction which undergo the additional processing start a predetermined length of time prior to the located event and end a predetermined length of time after the event. The output of the additional processing, such as the full texts of the parts of the segments surrounding the events, together with the events are processed by an analysis engine on step 415, to reveal at least one aspect related to the organization. In a preferred embodiment, when the initial processing is word spotting and the additional processing is transcription, the analysis engine optionally sorts the resulting texts according to the frequency of the spotted terms or additional words or terms found in the transcription, and matches spotted terms around which an interaction segment was transcribed, with additional terms found in the transcription of that segment. On step 420 the results of the analysis are presented to a user in a manner that enables the user to grasp the results of the analysis such as the initial events, the additional events, and their relations to the events emerging from the initial processing. The additional events, such as additional terms, optionally represent business, administrative, organizational, financial or other aspects, insights, or needs which are important for the user. The presentation can take multiple forms, including graphic presentations, text files or others. The presentation can also include or connect to additional options, such as playback, reports, quality monitoring systems, or others.

The disclosed method and apparatus provide a user with a systematic way of discovering important business aspects and insights from segments, optionally using an initial parameter set, such as an initial term list. The method and apparatus enable processing of a large amount of audio segments, since the usage of resources is efficient, and only areas of interactions or other segments which are initially found to be of interest undergo the intensive and resource-consuming processes, such as transcription. The larger part of the segments undergoes only initial processing such as word spotting which is less time and resource consuming. It will be appreciated by a person skilled in the art that many alternatives and embodiments exist to the disclosed method and apparatus. For example, an additional preprocessing engine can be used by the disclosed apparatus for enhancing the audio segments so that better results are achieved. Additionally, a step can be added in which a human user reviews the results of the additional processing such as the transcription and improves the parameters of the initial processing, for example by selecting words or terms to be used as terms in the initial processing A person skilled in the art will appreciate that a user can be offered an option to transcribe or activate another resource-consuming process around a predetermined point in an interaction, for example to transcribe in every interaction to part extending between 30 seconds for the beginning and 90 seconds from the beginning. Alternatively, the additional processing can be performed around a location in the interaction as selected by a user. For example, if a user located an interesting area, although no event was automatically detected in that area, the user can receive the results of additional processing for that part of the interaction.

It will be appreciated by persons skilled in the art that the present invention is not limited to what has been particularly shown and described hereinabove. Rather the scope of the present invention is defined only by the claims which follow.

What is claimed is:

1. A method for revealing an at least one aspect related to an organization from an audio signal, the method comprising the steps of:
   performing an initial processing on the audio signal for locating an at least one event within the audio signal, the at least one event associated with an at least one time indication within the audio signal;
   performing additional processing on a part of the audio signal, the part extending at least a first predetermined length of time preceding the least one time indication associated with the event and at least a second predetermined length of time following the at least one time indication associated with the event, the additional processing providing output related to the audio signal; and
   analyzing the at least one event and the output of the additional processing to reveal an at least one aspect related to the organization,
   wherein analyzing the at least one event and the output of the additional processing comprises at least one of the group consisting of: link analysis, root cause analysis, finding relations, finding connections, finding an at least one hidden pattern, and clustering of at least two audio segments based on the initial processing.

2. The method of claim 1 further comprising a preprocessing step for enhancing the audio signal.

3. The method of claim 1 further comprising a presentation step for presenting a presentation of the at least one aspect related to the organization.

4. The method of claim 3 wherein the presentation is a graphic presentation.

5. The method of claim 3 wherein the at least one event is marked on the presentation wherein the marking is indicative to a characteristic of the event.

6. The method of claim 3 wherein a connection between the at least one event and the at least one aspect is marked.

7. The method of claim 6 wherein the connection is marked in a manner indicative to a characteristic of the connection.

8. The method of claim 1 wherein the initial processing comprises activating at least one of the group consisting of: a word spotting process, a phonetic decoding process, an emotion detection process, and a call flow analysis process.

9. The method of claim 1 wherein the additional processing comprises activating a speech-to-text process.

10. The method of claim 1 wherein the audio signal is captured from a source selected from the group consisting of: a telephone, a voice over IP source, a walk-in recording, a TV broadcast, a radio broadcast, an audio signal downloaded from the internet, an audio file, an audio stream, audio data of a video file, and audio data of a video stream.

11. An apparatus for revealing an at least one aspect related to an organization from an audio signal, the apparatus comprising:
- an initial processing component for activating an at least one initial processing engine for locating an at least one event within the audio signal, the at least one event associated with a time indication within the audio signal;
- an additional processing component for activating an at least one additional processing engine for performing additional processing on a part of the audio signal, the part extending at least a first predetermined length of time preceding the time indication associated with the event and at least a second predetermined length of time following the time indication associated with the event, the additional processing providing output related to the audio signal;
- an analysis component for analyzing the at least one event and the output of the additional processing to reveal the at least one aspect related to the organization; and
- a capturing or logging component for capturing or logging audio signals from an at least one source selected from the group consisting of: a telephone, a voice over IP source, a walk-in recording, a TV broadcast, a radio broadcast, an audio signal downloaded from the internet, an audio file, an audio stream, audio data of a video file and audio data of a video stream.

12. The apparatus of claim 11 further comprising a logging or capturing component for logging or capturing the audio signal.

13. The apparatus of claim 11 further comprising a presentation component for presenting the at least one aspect related to the organization.

14. The apparatus of claim 11 further comprising a storage component for storing the at least one aspect or the at least one event or the output or the aspect.

15. The apparatus of claim 11 further comprising a playback component for playing the audio signal.

16. The apparatus of claim 11 further comprising a report generation component for generating an at least one report relating to the at least one event or to the output of the additional processing.

17. The apparatus of claim 11 further comprising a quality monitoring component for monitoring an at least one quality parameter associated with a participant in an interaction represented by the audio signal.

* * * * *